United States Patent [19]
Shimegi et al.

[11] Patent Number: 5,311,107
[45] Date of Patent: May 10, 1994

[54] METHOD AND APPARATUS FOR STOPPING DC MOTOR BY BRAKE POWER CORRESPONDING TO ROTATION FREQUENCY OF MOTOR AND DISK STORAGE UNIT HAVING SUCH APPARATUS

[75] Inventors: Hiroo Shimegi, Amagasaki; Akira Mashimo, Musashino; Hiroyuki Onda, Musashino; Katsuya Enami, Musashino; Hiroshi Takahashi, Musashino, all of Japan

[73] Assignees: Mitsubishi Electric Corporation; Teac Corporation, Japan

[21] Appl. No.: 63,124

[22] Filed: May 14, 1993

Related U.S. Application Data

[63] Continuation of Ser. No. 740,008, Aug. 2, 1991, abandoned.

[30] Foreign Application Priority Data

Aug. 6, 1990 [JP] Japan .................................. 2-207864
Aug. 6, 1990 [JP] Japan .................................. 2-207865

[51] Int. Cl.[5] .............................................. H02P 3/00
[52] U.S. Cl. ..................................... 318/369; 318/261
[58] Field of Search ................ 318/362, 365, 366-369, 318/381, 261, 273, 264, 275, 254, 138, 439

[56] References Cited

U.S. PATENT DOCUMENTS

| | | | |
|---|---|---|---|
| 3,833,846 | 9/1974 | Schmalzriedt | 318/369 |
| 3,836,833 | 9/1974 | Harris et al. | 318/369 X |
| 3,872,365 | 3/1975 | Vignaud et al. | 318/369 X |
| 3,895,277 | 7/1975 | Klumpp | 318/369 X |
| 3,906,315 | 9/1975 | Gotisar | 318/369 X |
| 4,438,377 | 3/1984 | Sakai et al. | 318/254 |
| 4,732,099 | 3/1988 | Neki et al. | 318/369 X |
| 4,804,893 | 2/1989 | Melocik | 318/273 X |

*Primary Examiner*—Jonathan Wysocki
*Attorney, Agent, or Firm*—Andrus, Sceales, Starke & Sawall

[57] ABSTRACT

A motor stopping apparatus detects a rotation frequency of a motor to which a load is attached, and applies break power in accordance with the rotation frequency to the motor until the motor is approximately stopped. The apparatus may be provided in a disk storage.

11 Claims, 12 Drawing Sheets

METHOD AND APPARATUS FOR STOPPING DC MOTOR BY BRAKE POWER CORRESPONDING TO ROTATION FREQUENCY OF MOTOR AND DISK STORAGE UNIT HAVING SUCH APPARATUS

The present application in a continuation application of U.S. patent application Ser. No. 07/740,008, filed Aug. 2, 1991, and now abandoned.

BACKGROUND OF THE INVENTION

The present invention relates generally to methods and apparatuses for stopping motors and disk storage unit having such apparatuses, and more particularly to a method and apparatus for stopping a DC motor and a disk storage unit having such an apparatus.

A brushless motor, which is a miniature precision DC motor without a brush, comprises a rotor comprising a permanent magnet and a stator comprising an armature. The brushless motor detects a position of the rotor and controls an armature voltage so that a torque angle constantly becomes $\pi/2$. It is required that the brushless motor used for a spindle motor of an optical disk have a high responsiveness. When the brushless motor is braked, a constant backward voltage is applied to the armature thereof until the motor decelerates to a predetermined rotating speed in response to a reverse rotation command. After the applied voltage is released, the motor then coast or naturally stops rotating from the predetermined rotating speed. On the other hand, the constant backward voltage may be applied to the motor until the motor reversely rotates, and then the applied voltage is released so as to naturally stop the motor. Incidentally, the strength of the applied voltage is constant irrespective of the load attached to the motor.

However, the above conventional method has the following disadvantages in that;

1. since there is a natural stopping period during which the motor naturally stops, it takes much time for the motor to completely stop.

2. the applied voltage is constant irrespective of the load applied to the motor. Therefore, if a plastic optical disk is applied to a motor brake apparatus corresponding to a glass optical disk, the plastic optical disk cannot step within a desired period.

SUMMARY OF THE INVENTION

Accordingly, it is a general object of the present invention to provide a novel and useful method and apparatus for stopping a DC motor and a disk storage unit having such an apparatus.

Another object of the present invention is to provide a method and apparatus for stopping a DC motor within a period shorter than the conventional one and a disk storage unit having such an apparatus.

Still another object of the present invention is to provide a method and apparatus for properly stopping a DC motor irrespective of the weight of the load applied to the motor, and a disk storage unit having such an apparatus.

According to one feature of the present invention, a motor stopping method comprises the steps of detecting a rotation frequency of a motor to which a load is attached, and applying brake power to the motor in accordance with the rotation frequency until the motor is approximately stopped.

According to another feature of the present invention, a motor stopping apparatus comprises rotation detecting means for detecting a rotation frequency of the motor to which a load is attached, and brake means, coupled to the rotation detecting means, for applying brake power which corresponds to the rotation frequency detected by the rotation detecting means to the motor until the motor is approximately stopped. Incidentally, the motor stopping apparatus further comprises load detecting means, coupled to the brake means, for detecting a weight of the load, the brake means applying the brake power to the motor which corresponds to the weight of the load detected by the load detecting means so that the motor can be stopped within a period which remains approximately constant irrespective of the weight of the load.

According to still another feature of the present invention, a disk storage unit comprises a head for recording information on a disk and/or reproducing information therefrom, a motor which rotates the disk, and a motor control device which controls the operation of the motor, the motor control device comprising rotation detecting means for detecting a rotation frequency of the motor, and brake means, coupled to the rotation detecting means, for applying brake power to the motor which corresponds to the rotation frequency detected by the rotation detecting means until the motor is almost stopped. Incidentally, the motor control device further comprises load detecting means, coupled to the brake means, for detecting a weight of the disk, the brake means applying the brake power which corresponds to the weight of the disk detected by the load detecting means so that the motor can be stopped within a period which remains approximately constant irrespective of the weight of the disk.

According to the present invention, the brake power which corresponds to the rotation frequency of the motor is applied to the motor until the motor is almost stopped. Therefore, there is little time for stopping the motor naturally, and thus the motor can be stopped in a time shorter than the conventional one. In addition, because of the load detecting means, the motor can be stopped within a period which remains approximately constant irrespective of the weight of the load.

Other objects and further features of the present invention will become apparent from the following detailed description when read in conjunction with the accompanying drawings.

BRIEF DESCRIPTION OF THE DRAWINGS

FIG. 10(a)-10(c) shows a time chart of the time detecting means shown in FIG. 9;

DESCRIPTION OF THE PREFERRED EMBODIMENTS

Figure 1:
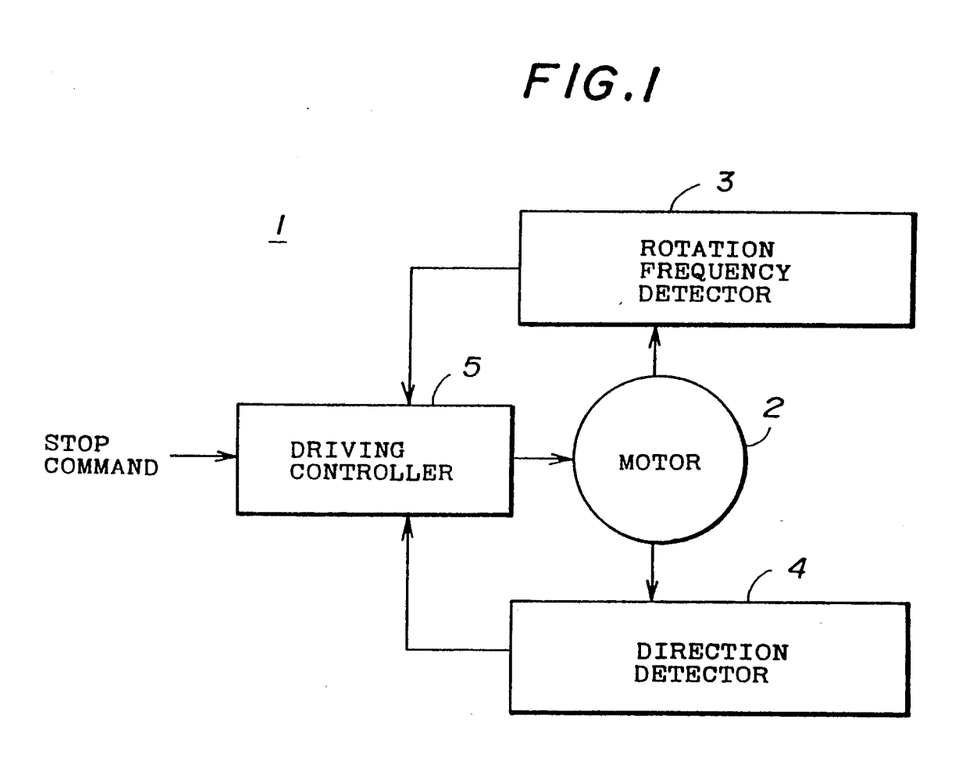
FIG. 1 shows a principle view of a motor stopping apparatus according to the present invention.

A motor stopping apparatus 1 comprises, in principle, as shown in FIG. 1, a motor 2, a rotation frequency detector 3, a direction detector 4 and a driving controller 5. The motor 2 is coupled to the rotation frequency detector 3, direction detector 4 and driving controller 5, respectively. In addition, the driving controller 5 is coupled to the rotation frequency detector 3 and the direction detector 4.

The motor 2 is a DC motor comprising an armature with a plurality of windings, and a rotor. The motor 2 may comprise, for example, a brushless motor or a coreless motor.

The rotation frequency detector 3 detects the rotation frequency of the motor 2, and outputs a signal corresponding to the rotation frequency to the driving controller 5. The rotation frequency detector 3 may detect the rotation frequency sequentially or every predetermined period. The rotation frequency detector 3 may detect the induced voltage generated from the windings of the armature of the motor or may detect a tachopulse.

The direction detector 4 detects a direction of the rotation of the motor 2 and outputs a forward direction signal when the motor 2 rotates in a forward direction and a backward direction signal when the motor 2 rotates in a backward direction to the driving controller 5.

The driving controller 5 is coupled to the windings of the motor 2, and electrically controls the stopping of the motor 2 based on the detecting results of the rotation frequency detector 3 and the direction detector 4 and an external stop command. The driving controller 5 may apply braking voltage, which is sequentially decreased in accordance with the rotation frequency of the motor 2, to the motor 2, or may apply a constant magnitude braking voltage periodically to the motor 2.

A description will now be given of the operation of the motor stopping apparatus shown in FIG. 1. First, a rotation frequency of the motor 2 is detected by the rotation frequency detector 3, which outputs a signal corresponding thereto to the driving controller 5. In addition, the direction detector 4 outputs the forward signal to the driving controller 5. The driving controller 5 applies the braking power to the motor 2, based on the rotation frequency of the motor 2 via the windings, in response to the stop command. If the constant magnitude breaking voltage is applied periodically to the motor 2, the interval between application can be made gradually longer. On the other hand, if a variable voltage is applied to the motor sequentially or every predetermined period, the voltage is sequentially decreased. When the direction detector 4 outputs the backward signal to the driving controller 5, the driving controller 5 stops applying the braking power to the motor 2 and the motor 2 is allowed to stop naturally.

A description will now be given of the motor stopping apparatus 1 of the first embodiment according to the present invention with reference to FIG. 2. Those elements which are the same as corresponding elements in FIG. 1 are designated by the same reference numerals, and a description thereof will be omitted. The motor stopping apparatus 1 of this embodiment comprises the motor 2, the rotation frequency detector 3, the direction detector 4, the driving controller 5 and a main controller 7.

The motor 2 is a brushless motor comprising a stator having windings 2a to 2c and a rotor (not shown) having a permanent magnet.

The rotation frequency detector 3 comprises frequency generators (FG) 1 and 2. The frequency generators FG1 and FG2 are respectively coupled to the motor 2. The frequency generators FG1 and the frequency generator FG2 detect the rotation frequency of the motor 2 in a forward or backward direction of rotation. Since the frequency generators FG1 and the FG2 frequency generators are respectively located at the different positions on the motor 2, there is a phase difference between the outputs thereof.

Figure 6A:
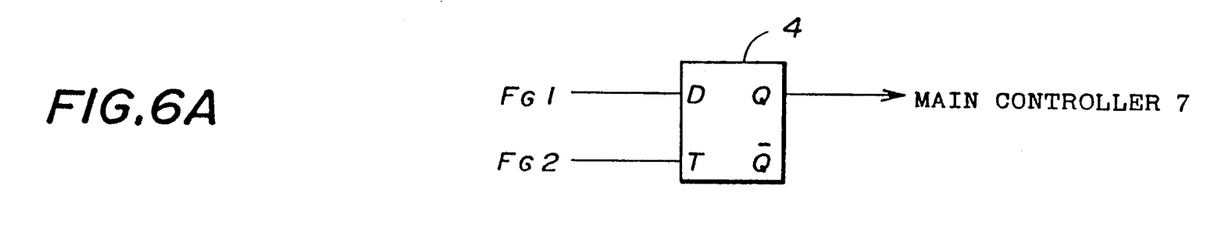
FIG. 6A shows an example of the direction detector shown in FIG. 2.
Figure 6B:
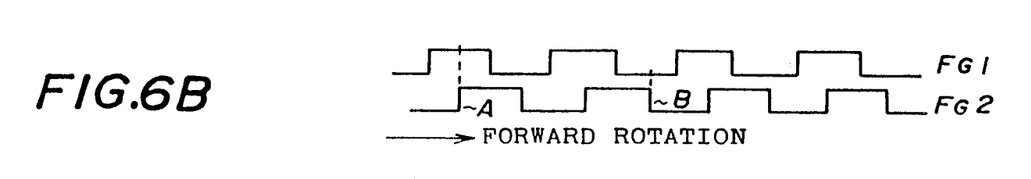
FIG. 6B shows an example of a rotation detector shown in FIG. 2.
Figure 6C:
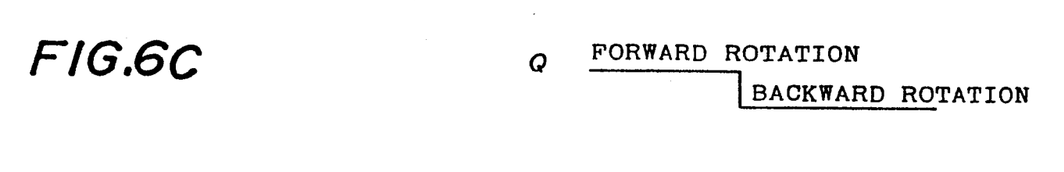
FIG. 6C shows an example of a waveform view of the direction detector shown in FIG. 6A.

The input terminals of the direction detector 4 are respectively coupled to the output terminals of the frequency generator FG1 and the frequency generator FG2. The output terminal of the direction detector 4 is coupled to the input terminal of the main controller 7. The direction detector 4 detects the rotating direction of the motor 2 by means of the outputs of the FG1 frequency generator and the frequency generator FG2. The direction detector 4 comprises, for example, a D-type flip flop shown in FIG. 6A. Referring to FIG. 6A, the frequency signal is inputted into a data input terminal D of the direction detector 4 and the frequency signal is inputted into a trigger input terminal T thereof. An output terminal Q of the direction detector 4 is coupled to the input terminal of the main controller 7. As to the outputs of the FG1 frequency generator and the FG2 frequency generator when the motor 2 is rotated in the forward direction, time passes in the right direction of the FIG. 6B. In addition, as to the outputs of the FG1 frequency generator and the frequency generator FG2 when the motor 2 is rotated in the backward direction, time passes in the left direction of FIG. 6B. Incidentally, the flip flop shown in FIG. 6A reads out the data at the leading edge of the trigger. Therefore, as shown in FIGS. 6B and 6C, the output terminal Q of the flip flop 4 becomes at a high level when the motor 2 rotates in the forward direction because the output of the frequency generator FG1 corresponding to the leading edge of the output of the frequency generator FG2 is a high level, and becomes at a low level when the motor 2 rotates in the backward direction because the output of the frequency generator FG1 corresponding to the leading edge of the output of the frequency generator FG2 is a low level.

The driving controller 5 comprises a driver 10, a phase comparator 11, an oscillator 12, an amplifier 13, a monostable multivibrator 15 and a switch S. The driver 10 is coupled to the windings 2a to 2c of the motor 2. Input terminals of the phase comparator 11 are coupled to an output terminal of the oscillator 12 and an output terminal of the frequency generator FG1. An output terminal of the phase comparator 11 is coupled to an input terminal of the amplifier 13. Incidentally, an integration circuit (not shown) may be provided between the phase comparator 11 and the amplifier 13. The output terminal of the frequency generator FG1 is coupled to a + input terminal of the comparator 14, and a − input terminal thereof is grounded. An output terminal of the comparator 14 is coupled to an input terminal of the monostable multivibrator 15. The output terminal of the amplifier 13 and the output terminal of the monostable multivibrator 15 are alternatively coupled to the switch S1. The switch S1 is coupled to an input terminal of the driver 10.

The driver 10 electrically stops and rotates the motor 2 via the windings 2a to 2c. The phase comparator 11 compares the phase of the rotation frequency from the FG1 frequency generator with the phase fixed frequency from the oscillator 12. The amplifier 13 amplifies the comparison result of the comparator 11. The phase comparator 11, the amplifier 13 and the driver 10 control the rotating of the motor 2 by means of a feedback control.

The comparator 14 performs a waveform shaping for the output of the frequency generator FG1 by comparing the rotation frequency of the frequency FG1 with the reference value (0 V). If the rotation frequency of the frequency generator FG1 exceeds the reference value, the output of the comparator 14 becomes a high level. On the other hand, if the rotation frequency of the frequency generator FG1 is less than the reference value, the output of the comparator 14 becomes a low level. The monostable multivibrator 15 has a predetermined time constant, pulse-modulates the output of the comparator 14 by the time constant, and outputs it to the driver 10. The switch S1 alternatively supplies the output of the amplifier 13 or that of the monostable multivibrator 15 to the driver 10.

The output terminal of the main controller 7 is coupled to the input terminal of the driver 10. The main controller 7 outputs a motor ON/OFF signal to the driver 10 based on forward rotation/backward rotation signals and the output of the direction detector 4. The motor off signal corresponds to the stop command in FIG. 1.

Figure 3A:
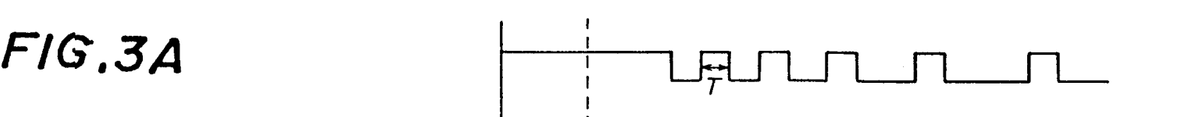
FIG. 3A shows a waveform view of a monostable multivibrator shown in FIG. 2.
Figure 3B:
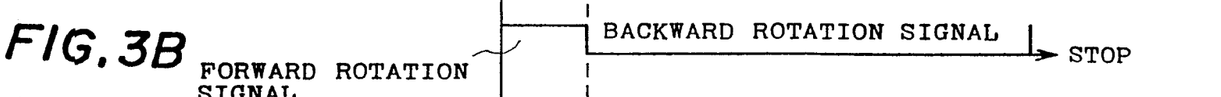
FIG. 3B shows a waveform view of forward rotation/backward rotation signals output from a main controller shown in FIG. 2.
Figures 3C, 3D:
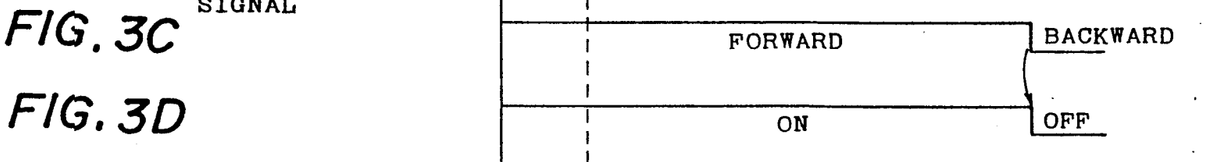
FIG. 3C shows a waveform view of a pulse output from a direction detector shown in FIG. 2.
FIG. 3D shows a waveform view of a motor ON/OFF signal output from the main controller shown in FIG. 2.

Next, a description will be given of the operation of the motor stopping apparatus 1 with reference to FIG. 3. First, a motor ON signal shown in FIG. 3D and the forward signal shown in FIG. 3B are respectively outputted from the main controller 7 to the driver 10, and thus the driver 10 rotates the motor 2 in the forward direction via the windings 2a to 2c. Incidentally, the switch S1 then connects the amplifier 13 to the driver 10. In addition, the frequency generator FG1 and the FG2 respectively detect the rotation frequency of the motor 2 and then output it to the direction detector 4. The output of the frequency generator FG1 is input to the phase comparator 11. The direction detector 4 outputs, as shown in FIGS. 6B and 6C, a forward signal shown in FIG. 3C to the main controller 7 when it detects the forward rotation of the motor 2. On the other hand, the phase comparator 11 compares the phase of the fixed frequency transmitted from the oscillator 12 and the phase of the rotation frequency transmitted from the frequency generator FG1, and controls the motor 2 via the windings 2a to 2c by means of the feedback control so that the phase differences can be eliminated.

When the main controller 7 outputs the backward rotation signal to the driver 10, the switch S1 switches to the monostable multivibrator 15 side. After the rotation frequency of the motor 2 detected by the frequency generator FG1 is input to the comparator 14, the comparator 14 performs waveform shaping for the rotation frequency and then outputs it to the monostable multivibrator 15. The monostable multivibrator 15 outputs a stop pulse having a pulse-width of T shown in FIG. 3A in response to the leading edge of the pulse output from the comparator 14. The frequency of the stop pulse changes in accordance with the rotation frequency output from the frequency generator FG1. That is, as shown in FIG. 3A, the stop pulse frequency is relatively high when the rotation frequency of the motor 2 is relatively high, while the stop pulse frequency is relatively low when the rotation frequency of the motor 2 is relatively low. Thus, the slower the motor 2 rotates, the longer an interval between the stop pulses becomes.

Figure 3E:
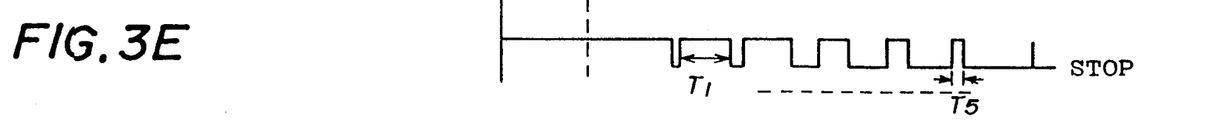
FIG. 3E shows another waveform view of the monostable multivibrator shown in FIG. 2.
Figure 4:
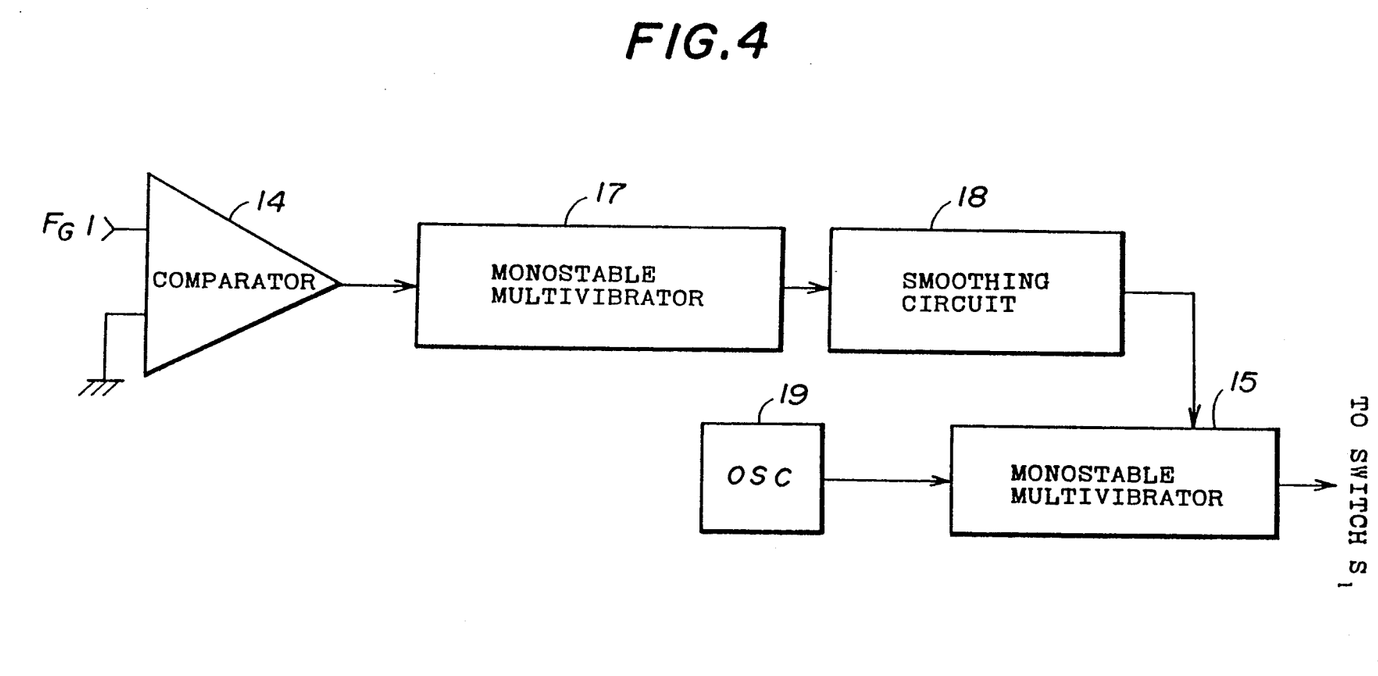
FIG. 4 shows a block diagram in FIG. 2 which is partially altered in order to obtain a stop pulse shown in FIG. 3E.

A description will now be given of the motor stopping apparatus which varies the pulse-width T with reference to FIG. 4. As shown in FIG. 4, a monostable multivibrator 17 and a smoothing circuit 18 are connected in series between the comparator 14 and the monostable multivibrator 15, and the monostable multivibrator 15 is coupled to a oscillator 19. The rotation frequency which is outputted from the frequency generator FG1 and for which the waveform shaping is performed by the comparator 14 is inputted into the monostable multivibrator 17. Since the rotation frequency becomes gradually small, a pulse-width determination pulse becomes accordingly small. The pulse-width determination pulse is inputted and made smooth by the smoothing circuit 18, and then inputted into the monostable multivibrator 15. The pulse-width determination pulse changes the time constant of the monostable multivibrator 15 which determines the pulse-width of the stop pulse. The time constant and the pulse-width T become gradually small. The monostable multivibrator 15 outputs the stop pulse in response to the leading edge of the oscillator 19 which outputs the reference pulse. As shown in FIG. 3E, an interval of the leading edge of the stop pulse is constant because of the reference pulse output from the oscillator 19. In addition, the pulse-width T becomes gradually small as indicated by $T_1$ to $T_5$.

Figure 5:
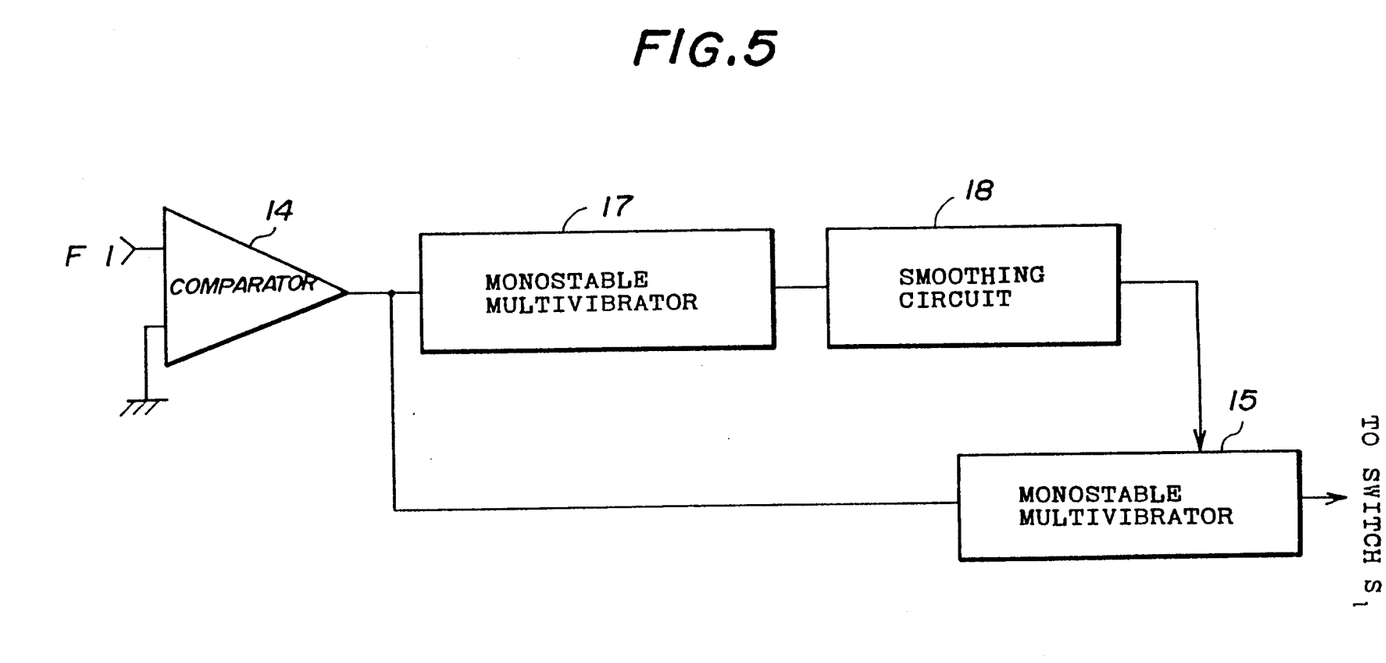
FIG. 5 shows another example of a block diagram of the motor stopping apparatus.

A description will now be given of the motor stopping apparatus which changes the pulse-width T and the frequency of the stopping pulse with reference to FIG. 5. As shown in FIG. 5, the comparator 14 serves as the oscillator 19 shown in FIG. 4. Thus, the frequency of the stop pulse becomes gradually smaller, as in the circuit of FIG. 2 and shown in the graph of FIG. 3A. In addition the pulse-width T becomes gradually smaller, as in the circuit of FIG. 4 and shown in FIG. 3E.

When the motor 2 gradually decelerates and the direction detector 4 detects the reversing of the motor 2, the direction detector 4 outputs the backward signal to the main controller 7. In response to the backward signal, the main controller 7 outputs the motor OFF signal shown in FIG. 3D to the driver 10 to stop the motor 2.

Thus, according to the present invention, since the braking power is applied until the motor is almost stopped, the motor coast or naturally stops momentarily and thus the motor can be stopped in a relatively short time.

Figure 7:
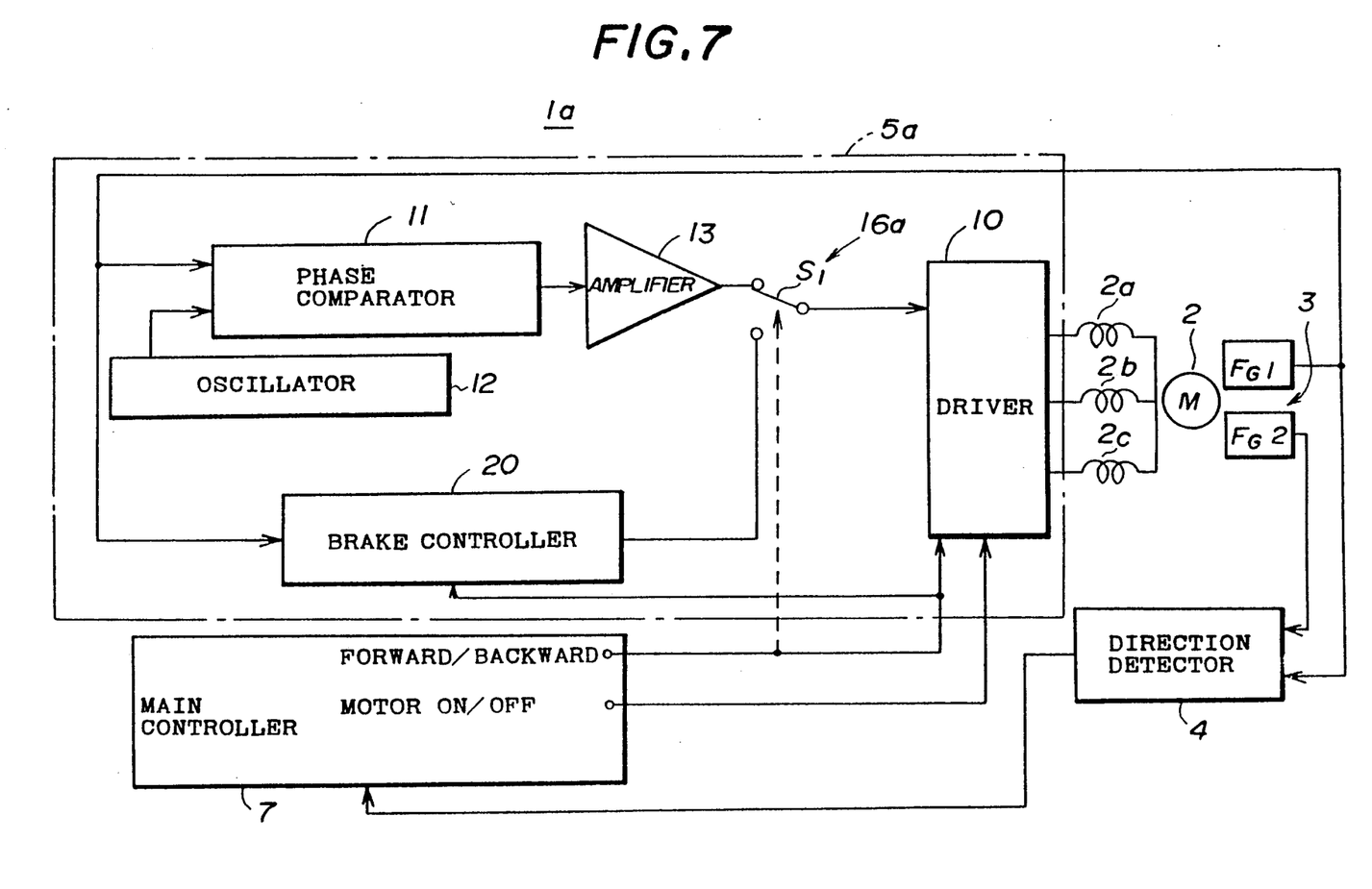
FIG. 7 shows a block diagram of a motor stopping apparatus of a second embodiment according to the present invention.

Next, a description will now be given of the motor stopping apparatus 1a of the second embodiment according to the present invention with reference FIG. 7. Incidentally, those elements which are the same as corresponding elements in FIG. 2 are designated by the same reference numerals, and a description thereof will be omitted. If disks made of different materials having different weights are attached to the motor stopping apparatus 1 of the first embodiment, the stop period is accordingly changed, even if it is changed to a period shorter than a stop period in the conventional disk storage. Accordingly, this embodiment has been designed to maintain a constant stop period even if the different loads are applied to the motor.

Figure 2:
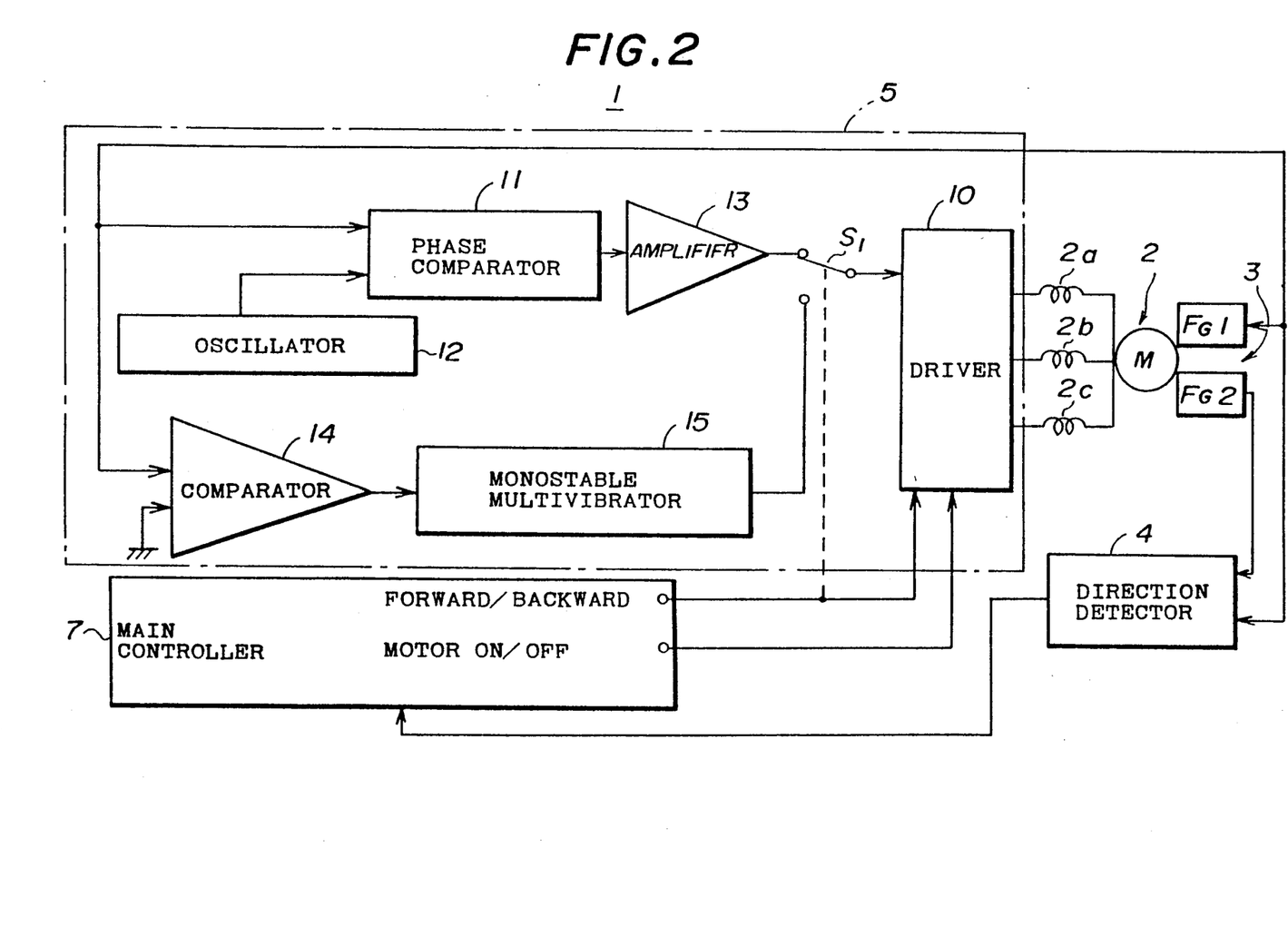
FIG. 2 shows a block diagram of the motor stopping apparatus of a first embodiment according to the present invention.
Figure 8:
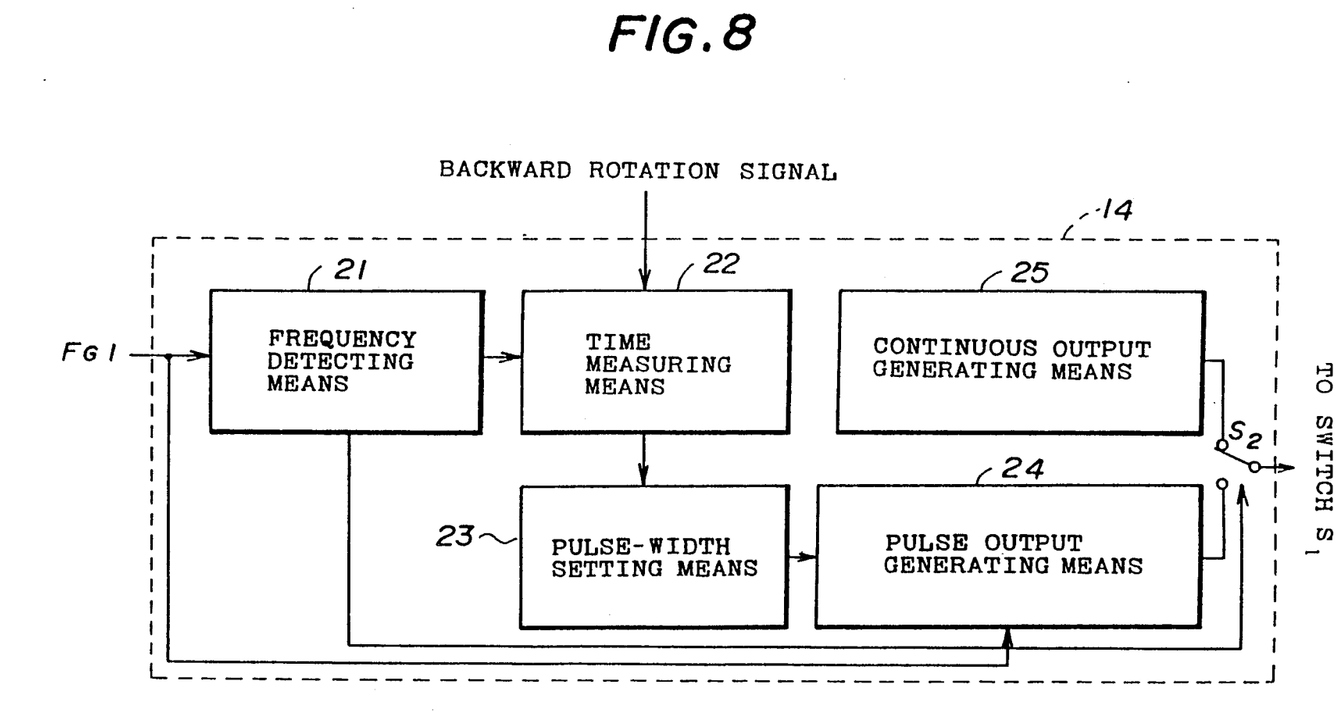
FIG. 8 shows a block diagram of a brake controller shown in FIG. 7

The motor stopping apparatus 1a according to this embodiment comprises a driving controller 5a corresponding to the driving controller 5 shown in FIG. 2. The driving controller 5a comprises a brake controller 20 instead of the comparator 14 and the monostable multivibrator 15. The driving controller 20 is further coupled to the main controller 7. The brake controller 20 measures the time it takes for a frequency of the motor to ascend descend to a predetermined value, and outputs the braking power in accordance with the measured time to the driver 10 via the switch $S_1$. The brake controller 20 comprises, as shown in FIG. 8, frequency detecting means 21, time measuring means 22, pulse-width setting means 23, pulse output generating means 24 and continuous output generating means 25. The frequency detecting means 21 is coupled to the time measuring means 22 and the switch $S_2$. The time measuring means 22 is coupled to the pulse-width setting means 23 and the main controller 7. The pulse-width setting means 23 is coupled to the pulse output generating means 24. One end of the switch $S_2$ is alternatively coupled to the continuous output generating means 25 and the pulse output generating means 24, and the other end thereof is coupled to the switch $S_1$.

Figure 9:
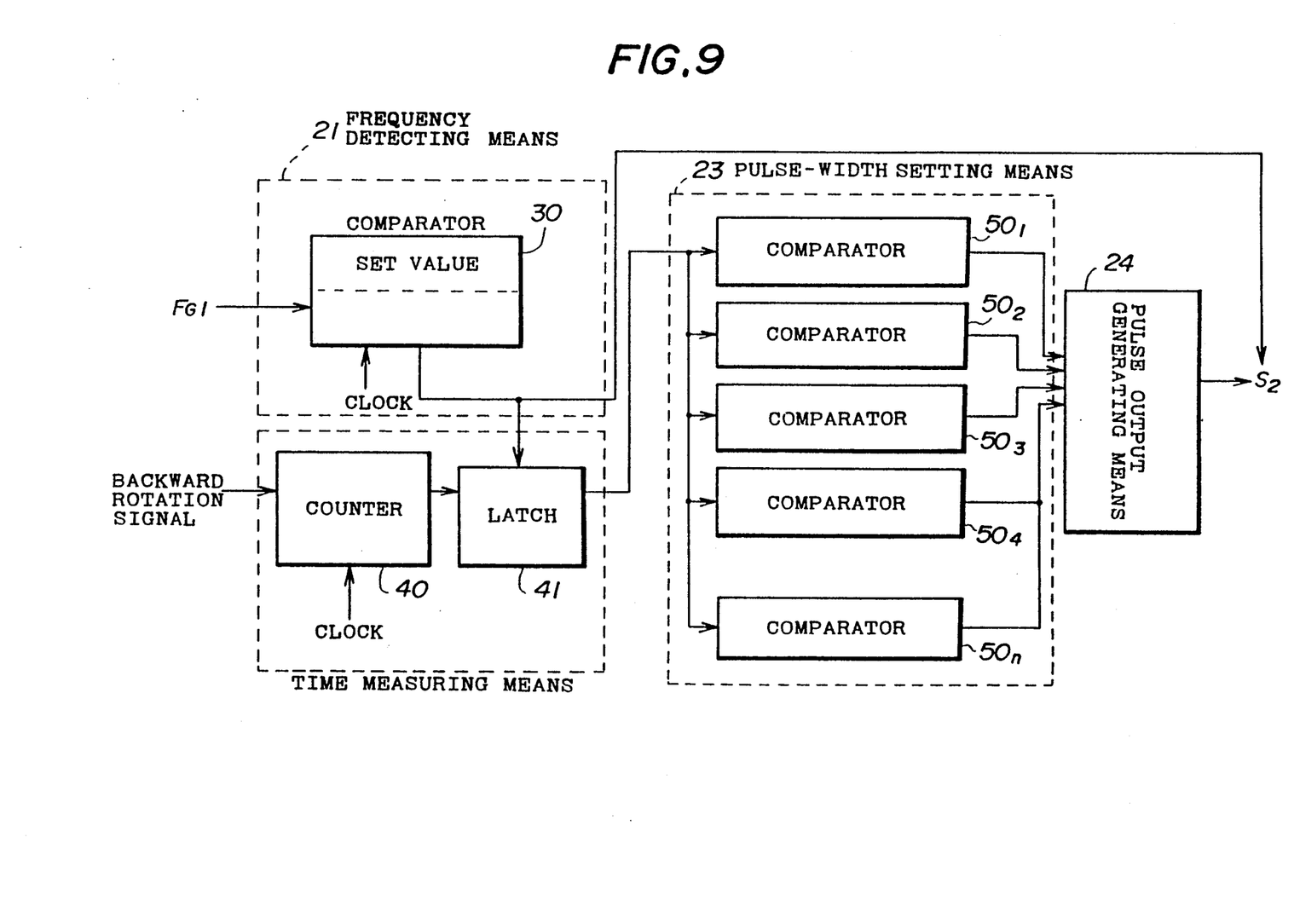
FIG. 9 shows an example of a block circuitry diagram of frequency detecting means, time detecting means and pulse-width setting means.
Figure 10:
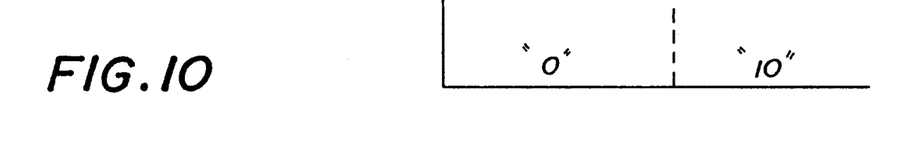
Figure 10A:
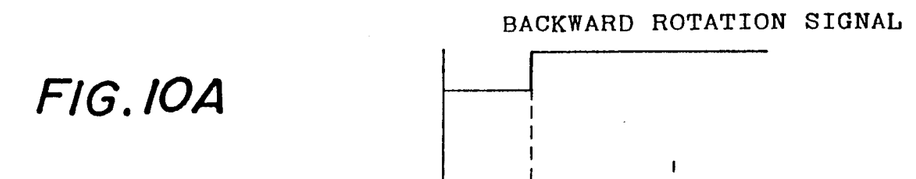
Figure 10B:
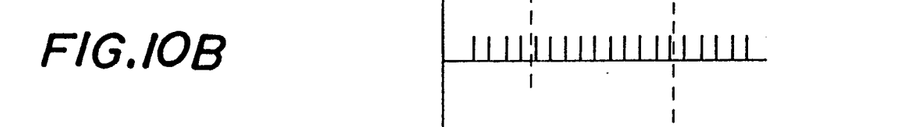
Figure 10C:
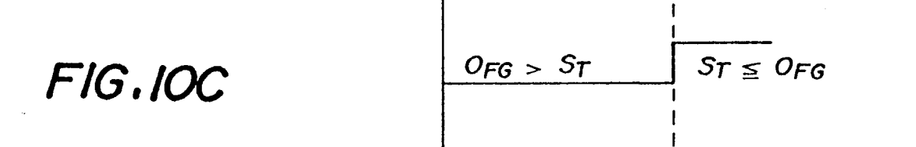

The frequency detecting means 21 switches the switch $S_2$ and informs the time measuring means 22 that the measuring has ended in response to the frequency signal input from the frequency generator FG1. The frequency detecting means 21 comprises, as shown in FIG. 9 a comparator 30 which compares the frequency $O_{FG}$ inputted from the frequency generator FG1 with a set value $S_F$ in synchronization with a clock output from the clock generator (not shown). As shown in FIG. 10C, if the frequency $O_{FG}$ output from the frequency generator FG1 is higher than the set value $S_F$, the output of the frequency detecting means 21 becomes low level. On the other hand, if the $O_{FG}$ frequency is equal to or lower than the set value $S_F$, the output of the frequency detecting means 21 becomes high level. If the frequency detecting means 21 outputs a high level signal to the switch $S_2$, the switch $S_2$ switches to the pulse output generating means 24 side. Incidentally, the normal predetermined frequency is lower than the rotation frequency of the motor 2.

The time measuring means 22 measures time wherein the rotation frequency of the motor 2 descends from an initial value to a predetermined value based on the backward rotation signal inputted from the main controller 7 and the output of the frequency detecting means 21, and outputs the measured value to the pulse-width setting means 23. The frequency measuring means 22 comprises, as shown in FIG. 9, a counter 40 and a latch 41. The counter 40 is coupled to the main controller 7, a clock generator (not shown) and the latch 41. The counter 40 measures the number of clock signals outputted from the clock generator in response to the backward rotation signal output from the main controller 7. The latch 41 outputs, as shown in FIG. 10D, a value "0" before the comparator 30 outputs a high level signal thereto, and outputs a measured value when the comparator 30 outputs the high level signal thereto. FIG. 10D shows a case where the measured value is "10".

The pulse-width setting means 23 sets the pulse-width in accordance with the measured value outputted from the time measuring means 22. The pulse-width setting means 23 comprises, as shown in FIG. 9, a plurality of comparators $50_l$ to $50_n$ aligned in parallel. These respective comparators $50_l$ to $50_n$ determine a pulse-width based on the measured value outputted from the latch 41. Each comparator may be substituted by an "and" circuit. In this case, the "and" circuit which has a value approximately equal to the measured value outputs the pulse-width to the pulse output generating means 24.

The pulse output generating means 24 outputs a signal representing a pulse-width set by the pulse-width setting means 23 in proportion to the frequency outputted from the frequency FG1.

The continuous output generating means 25 outputs a braking signal having a voltage value representing a predetermined pulse-width to the driver 10 via the switches $S_1$ and $S_2$ until the comparator 30 of the frequency detecting means 21 supplies a high level output to the latch 41.

Next, a description will be given of the operation of the motor stopping apparatus 1a shown in FIG. 7, having a brake controller 20 shown in FIGS. 8 and 9. First, the motor ON signal and the forward rotation signal are outputted from the main controller 7 to the driver 10, and thus the driver 10 rotates the motor 2 in the forward direction via the windings 2a to 2c. At this point, the operation of the motor stopping apparatus 1a is the same as that for the motor stopping apparatus 1 shown in FIG. 2, and a description thereof will be omitted.

The rotation frequency of the motor 2 is outputted from the frequency generator FG1 to the break controller 20.

When the motor 2 is to be stopped, the main controller 7 outputs the backward rotation signal shown in FIG. 10A to the switch 16a, the driver 10 and the brake controller 20. Thus, the switch $S_1$ is switched to the brake controller 20 side. In addition, the counter of the time measuring means 22 of the brake controller 20 measures the number of clock signals shown in FIG. 10B, and outputs the measured value to the latch 41. The rotation frequency $O_{FG}$ of the motor 2 decreases to the predetermined frequency $S_F$, as shown in FIG. 10C, and the output of the comparator 30 becomes a high level. Then the switch $S_2$ is switched to the pulse output generating means 24 side. In addition, the latch 41 outputs the measured value to the pulse-width setting means 23. The measured value is compared by the respective comparators $50_l$ to $50_n$, and the pulse-width corresponding to the measured value is determined by and outputted from one of the comparators $50_1$ to $50_n$ to the pulse output generating means 24. The pulse output generating means 24 outputs a control signal having a pulse-width set by the pulse-width setting means 23 to the driver 10 via the switches $S_1$ and $S_2$. Then the driver 10 brakes the motor 2 via the windings $2a$ to $2c$. The direction detector 4 detects the rotating direction by means of the phase difference between the outputs of the frequency generator FG1 and the frequency generator FG2, and outputs the backward signal to the main controller 7 when the rotating direction is reversed. The main controller 7 then outputs the motor OFF signal to the driver 10 to stop the motor 2 immediately.

Thus, the brake controller 20 sets a relatively wide pulse-width if the load of the motor 2 is heavy and the measured time is long, while the brake controller 20 sets a relatively narrow pulse-width if the load of the motor 2 is light and the measured time is short. Since the motor 2 can be controlled in accordance with the weight of the load of the motor, the motor 2 can always be stopped in a desired period.

Figure 11:
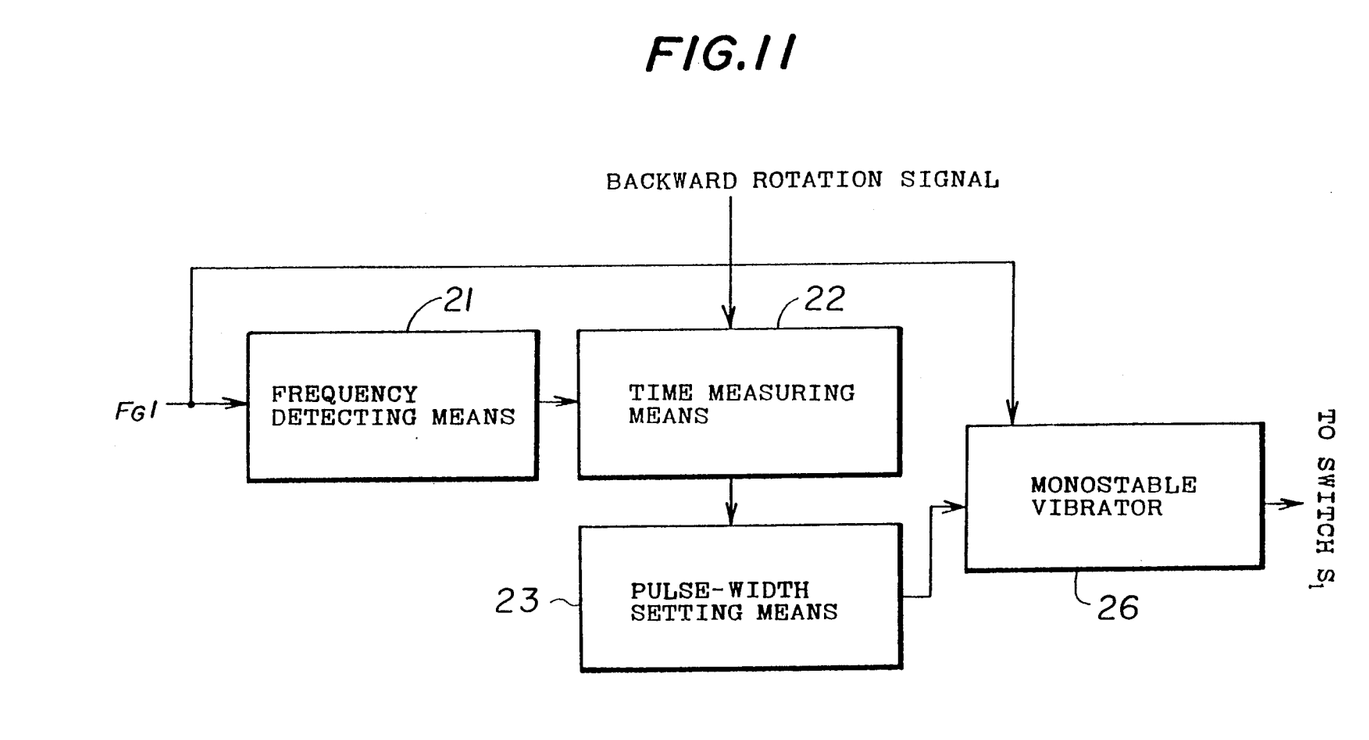
FIG. 11 shows another block diagram of the brake controller different from that shown in FIG. 8.

Incidentally, in the brake controller 20, as shown in FIG. 11, the continuous generating means 25 and the pulse output generating means 24 may be substituted by a monostable multivibrator 26. In this case, the pulse-width setting means 23 comprises a D/A converter. That is, while the time measuring means 22 is measuring time, the monostable multivibrator 26 continuously outputs the frequency output from the frequency generator FG1, and after the time has been measured, a pulse-width is determined based on a voltage value representing the measured value which is generated by D/A-converting the measured time by the pulse-width setting means 23. Incidentally, the time measuring means 22 may measure how long it takes for the motor to rotate from a stop state to a predetermined rotation frequency, and the pulse-width may be determined based on the measured time.

Figure 12:
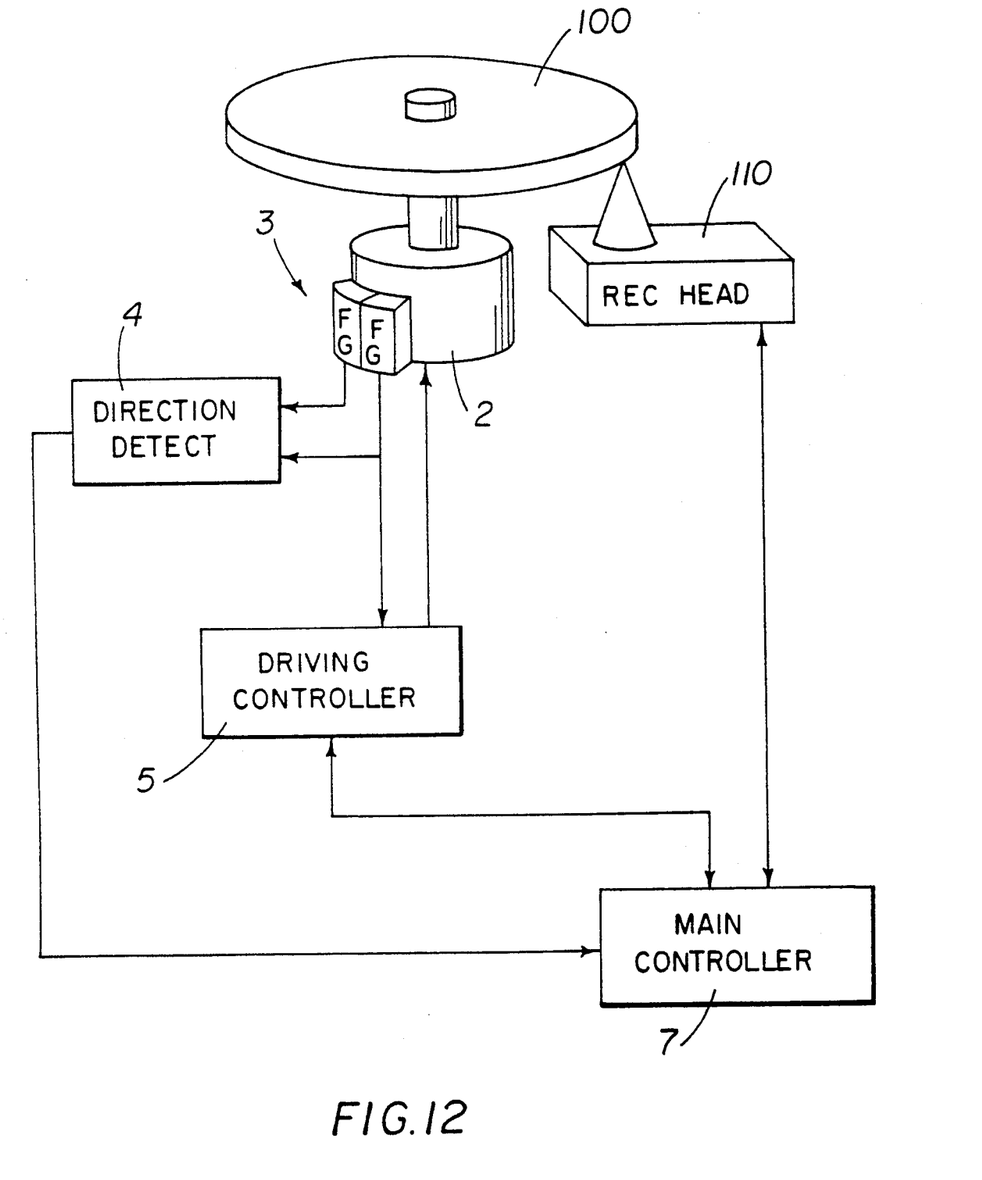
FIG. 12 shows a block diagram of a disk storage unit incorporating the motor stopping apparatus of the present invention.

A disk storage unit having motor 2 rotating a disk 100, rotation frequency detector 3, and driving controller 5 is shown in FIG. 12. The rotation frequency detector 3 and driving controller 5 have the same structure as those shown in FIG. 1. The disk storage unit also has a conventional recording head and associated controls 110 connected to main controller 7.

Further, the present invention is not limited to these preferred embodiments, and various variations and modifications may be made without departing from the scope of the present invention.

What is claimed is:

1. A motor stopping method comprising the steps of:
   (a) detecting a rotation frequency of a motor to which a load is attached; and
   (b) applying braking power to the motor in accordance with the rotation frequency until the motor is approximately stopped;
   wherein said method further comprises the following steps, performed before said step (b):
   (c) rotating the motor with the load at a first rotation frequency;
   (d) applying an initial braking power to the motor;
   (e) measuring a period during which the rotation frequency of the motor is changed from the first rotation frequency to a second rotation frequency lower than the first rotation frequency; and
   (f) comparing the measured period with a predetermined reference period, the amount of braking power applied in step (b) being determined in accordance with the comparison.

2. A motor stopping apparatus comprising:
   rotation detecting means for detecting a rotation frequency of a motor to which a load is attached;
   direction detecting means for detecting a direction of rotation of the motor, said direction detecting means outputting a detecting result when a direction of rotation of the motor driving the load changes from a first direction to a second direction opposite to the first direction; and
   brake means, coupled to said rotation detecting means and direction detecting means, for applying braking power to the motor which corresponds to the rotation frequency detected by said rotation detecting means so that the braking power decreases as the rotation frequency of the motor decreases, said braking power being applied until said direction detecting means outputs the detecting result.

3. A motor stopping apparatus according to claim 2, wherein said brake means supplies braking pulses to said motor at intervals, each of said braking pulses having a constant amplitude and a constant width, and wherein the intervals at which the braking power is applied to the motor gradually increase along with a decrease of the rotation frequency detected by said rotation detecting means.

4. A motor stopping apparatus according to claim 2, wherein said brake means supplies braking pulses to said motor at constant intervals, each of said braking pulses having a constant amplitude, and wherein the widths of the braking pulses gradually decrease along with a decrease of the rotation frequency detected by said rotation detecting means.

5. A motor stopping apparatus according to claim 2, wherein said rotation detecting means comprises first and second frequency generators respectively connected to the motor so that there is a phase difference between the outputs of the first and second frequency generators, and
   wherein said direction detecting means is coupled to said frequency generators, and the detecting result is generated based on an output of the first frequency generator with respect to to a leading edge or a trailing edge of an output of the second frequency generator.

6. A motor stopping apparatus according to claim 2, wherein said motor stopping apparatus further comprises load detecting means, coupled to said braking means, for detecting the weight of the load based on an alteration in the speed change characteristics of the motor due to the weight of the load, said brake means applying the braking power in accordance with the weight of the load detected by said load detecting means so that the motor can be stopped within a period that remains approximately constant irrespective of the load.

7. A motor stopping apparatus comprising:
   rotation detecting means for detecting a rotation frequency of a motor to which a load is attached;
   direction detecting means, coupled to said rotation detecting means, for detecting a direction of rotation of the motor, said direction detecting means outputting a detecting result when a direction of rotation of the motor driving the load changes from a first direction to a second direction opposite to the first direction;

load detecting means for detecting the weight of the load based on an alteration in the speed change characteristics of the motor due to the weight of the load; and brake means, coupled to said rotation detecting means, direction detecting means, and load detecting means, for applying brake power to the motor which corresponds to the rotation frequency detected by said rotation detecting means and the speed change of the load detected by said load detecting means until said direction detecting means outputs the detecting result;

wherein said load detecting means comprises:

time measuring means for measuring a first time period which represents how long it takes for the rotation frequency of the motor to change from a first rotation frequency to a second rotation frequency lower than the first rotation frequency in a case where said brake means applies a first braking power to the motor which has the load and is rotating at the first rotation frequency; and comparing means, coupled to the time measuring means, for comparing the first time period with a reference time period, said brake means applying braking power in accordance with a comparison result of said comparing means.

8. A motor stopping apparatus according to claim 7, wherein the comparing means comprises a plurality of comparators respectively coupled in parallel to the time measuring means, each comparator having a reference time period range different from the others, the first time period being inputted into the plurality of comparators in parallel, and the comparator which has a reference time period range corresponding to the first time period outputting the comparison result to said brake means.

9. A disk storage unit comprising:
a head for recording information on a disk and/or reproducing information therefrom;
a motor which rotates the disk; and a motor control device which controls the operation of said motor, said motor control device comprising:
rotation detecting means for detecting a rotation frequency of said motor;

direction detecting means, coupled to said rotation detecting means and said brake means, for detecting a direction of rotation of the motor, said direction detecting means outputting a detecting result when a direction of rotation of the motor driving the disk changes from a first direction to a second direction opposite to the first direction; and brake means, coupled to said rotation detecting means and direction detecting means, for applying braking power to the motor which corresponds to the rotation frequency detected by said rotation detecting means so that the braking power decreases as the rotation frequency of the motor decreases, said braking power being applied until said direction detecting means outputs the detecting result.

10. A disk storage unit according to claim 9, wherein said motor control device further comprises load detecting means, coupled to said brake means, for detecting the weight of the disk based on an alteration in the speed change characteristics of the motor due to the weight of the disk, said brake means applying the braking power in accordance with the weight of the disk detected by said load detecting means so that the motor can be stopped within a period which remains approximately constant irrespective of the weight of the disk.

11. A motor stopping method comprising the steps of:
(a) detecting a rotation frequency of a motor to which a load is attached; and
(b) applying braking power to the motor in accordance with the rotation frequency until the motor is approximately stopped;
wherein said method further comprises the following steps, performed before said step (b);
(c) experimentally rotating the motor with the load from a stop state to a first rotation frequency;
(d) measuring a period required for the rotation frequency of the motor to reach the first rotation frequency; and
(e) comparing the measured period with a predetermined reference period, the amount of braking power applied in step (b) being determined in accordance with the comparison.

* * * * *